United States Patent
Batzdorff et al.

(10) Patent No.: US 9,760,472 B2
(45) Date of Patent: Sep. 12, 2017

(54) TENANT CODE DEBUGGING IN MULTI-TENANT SYSTEMS

(71) Applicant: Veeva Systems Inc., Pleasanton, CA (US)

(72) Inventors: Eric Batzdorff, Alameda, CA (US); Jon Stone, Manteca, CA (US)

(73) Assignee: VEEVA SYSTEMS INC., Pleasanton, CA (US)

( * ) Notice: Subject to any disclaimer, the term of this patent is extended or adjusted under 35 U.S.C. 154(b) by 63 days.

(21) Appl. No.: 14/957,432

(22) Filed: Dec. 2, 2015

(65) Prior Publication Data

US 2017/0161171 A1 Jun. 8, 2017

(51) Int. Cl.
 *G06F 11/00* (2006.01)
 *G06F 11/36* (2006.01)

(52) U.S. Cl.
 CPC ...... *G06F 11/3624* (2013.01); *G06F 11/3664* (2013.01)

(58) Field of Classification Search
 CPC .................. G06F 11/3624; G06F 11/3664
 USPC ....................................................... 714/38.14
 See application file for complete search history.

(56) References Cited

U.S. PATENT DOCUMENTS

| | | | |
|---|---|---|---|
| 2011/0040826 A1* | 2/2011 | Chadzelek | H04L 67/02 709/203 |
| 2013/0100958 A1* | 4/2013 | Jalan | H04L 67/1027 370/401 |
| 2015/0263865 A1* | 9/2015 | Rangarajan | H04L 12/4633 370/254 |
| 2015/0339136 A1* | 11/2015 | Suryanarayanan | G06F 9/455 718/1 |
| 2016/0352690 A1* | 12/2016 | Wu | H04L 9/0819 |

* cited by examiner

*Primary Examiner* — Yair Leibovich

(57) ABSTRACT

Systems and methods for debugging tenant code for a multi-tenant system. A tenant code debugger may be installed on a user computing device, and connected to the multi-tenant system over a stateful connection. When an interested event occurs, the multi-tenant system may route execution to the user computing device for local debugging. A proxy may be used for the communications between the tenant code debugger and the multi-tenant system. When interaction with the multi-tenant system is needed, a request may be sent to the multi-tenant system which may interpret the request, execute to fulfill the request, and send the result back to the tenant code debugger, so that execution of the tenant code can be continued in the user computing device. The tenant code is uploaded to the multi-tenant system after debugging.

20 Claims, 4 Drawing Sheets

TENANT CODE DEBUGGING IN MULTI-TENANT SYSTEMS

BACKGROUND

The subject technology relates generally to code debugging, and more particularly to tenant code debugging in multi-tenant systems.

In a multi-tenant system, a number of tenants share the hardware and software of the system, and a tenant may upload its code (e.g., application code) to the system so that a system server can execute it. It is desirable to provide a debugging method which allows each tenant to debug their own code efficiently and securely.

SUMMARY

The disclosed subject matter relates to a method for debugging tenant code for a content management system. The method comprises sending a first message to the multi-tenant system over a first network connection. The first network connection is based on a stateless protocol and the first message is for accessing the tenant's share of the multi-tenant system. The method further comprises: upgrading the first network connection to a second network connection which is based on a stateful protocol; connecting a tenant code debugger to a local debugger; and sending a second message to the multi-tenant system to register a first event with the multi-tenant system. The first event may invoke execution of the tenant code. The method further comprises: receiving a third message at the tenant code debugger from the multi-tenant system that the first event occurred; and executing the tenant code locally at the tenant code debugger in response to the third message.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Figure 1:
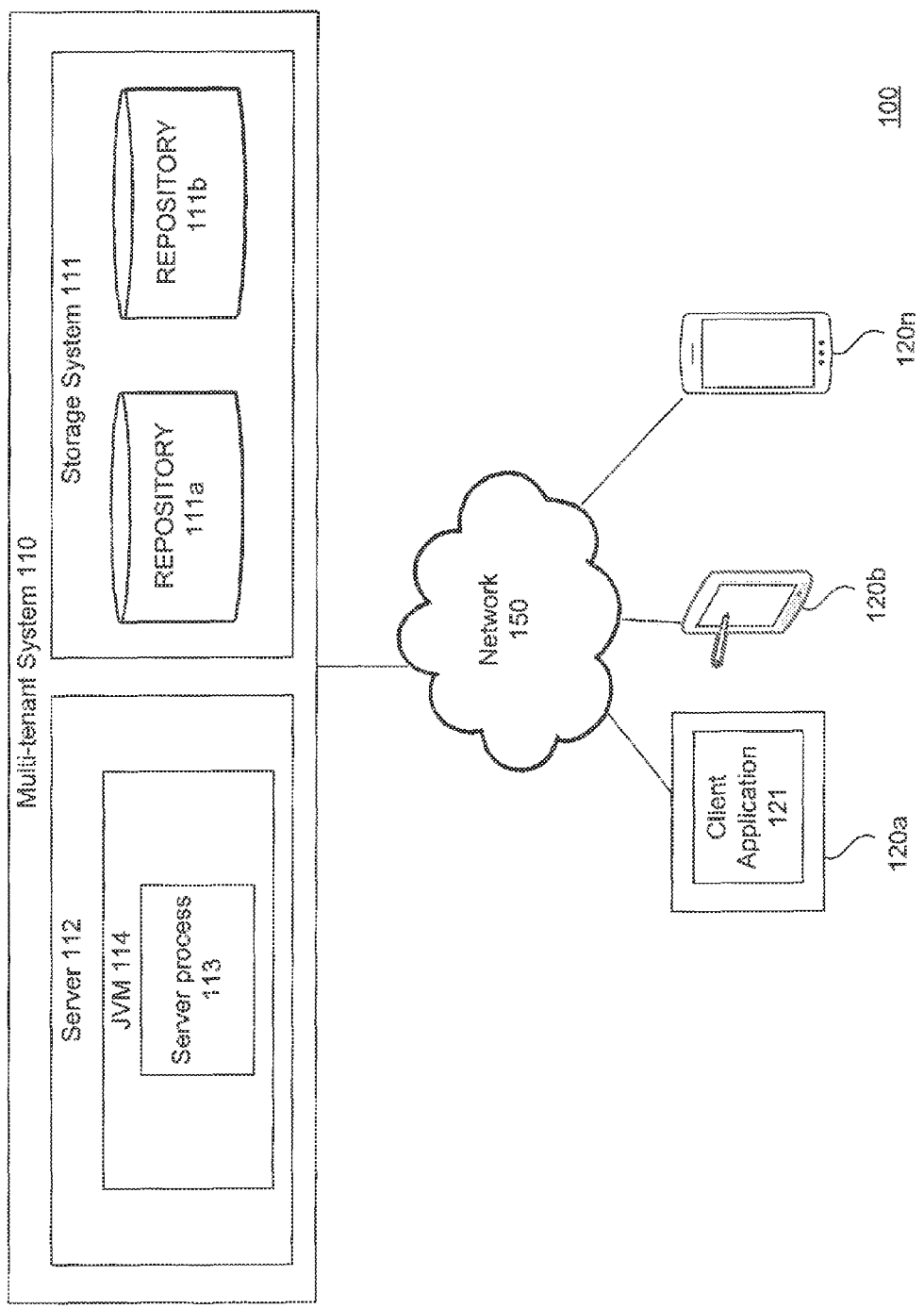
FIG. 1 illustrates an example high level block diagram of a multi-tenant architecture wherein the present invention may be implemented.

FIG. 1 illustrates an example high level block diagram of a multi-tenant architecture 100 wherein the present invention may be implemented. As shown, the architecture 100 may include a multi-tenant system 110, and a plurality of user computing devices 120a, 120b, . . . 120n, coupled to each other via a network 150. The multi-tenant system 110 may include a storage system 111 and a server 112. The network 150 may include one or more types of communication networks, e.g., a local area network ("LAN"), a wide area network ("WAN"), an intra-network an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to access the multi-tenant system 110 via the network 150, and may be any commercially available computing devices including laptop computers, desktop computers, mobile phones, smart phones, tablet computers, netbooks, and personal digital assistants (PDAs). A client application 121 may run from a user computing device, e.g., 120a, and access the system 110 via the network 150.

The server 112 is typically a remote computer system accessible over a remote or local network, such as the network 150. The server 112 could be any commercially available computing devices. A server process 113 may be active on the server 112. The user computing device and the server process 113 may communicate with each other over the network 150, thus providing distributed functionality and allowing multiple user computing devices to take advantage of the information-gathering capabilities of the system 110. Although FIG. 1 shows only one server, it should be understood that the system 110 may have multiple servers.

In one example, the server 112 may have a Java virtual machine ("JVM") 114 which may route a request from a user computing device to a repository (e.g., 111a or 111b) that the user is authorized to access. The server process 113 may run in the JVM 114.

The storage system 111 may store data in one or more repositories (e.g., 111a and 111b) that user computing devices may access. Code from different tenants may be executed in a common space in the server 112, but each tenant's data is segregated from other tenants' data in the storage system 111 by hardware or software. The storage system 111 may be any commercially available storage devices. In one example, the multi-tenant system 110 is a content management system, and the repositories may store content (e.g., documents in various formats) for tenants.

In a multi-tenant system, various elements of hardware and software may be shared by two or more tenants. For instance, the server 112 may simultaneously process requests from a plurality of tenants, and the storage system 111 may store data for a plurality of tenants. Each tenant may be assigned a repository (e.g., 111a) which is separated and secured from other tenants' data, by hardware or software. In a multi-tenant system, a user is typically associated with a particular tenant and is authorized by the tenant to access its repository. In one example, a user could be an employee of a pharmaceutical company which is a tenant, or customer, of the system 110. Each tenant has an exclusive share of the software and hardware of the system 110.

In one embodiment, the multi-tenant system 110 may run on a cloud computing platform. Users can access data on the cloud independently by using a virtual machine image, or purchasing access to a service maintained by a cloud database provider.

In one embodiment, the multi-tenant system 110 may be provided as Software as a Service ("SaaS") to allow users to access the system 110 with a thin client or a browser.

A tenant may register tenant code in its repository to run a particular event in the lifecycle of a record in the repository. The tenant code may be called triggers. In one implementation, a first tenant may register tenant code in its repository (e.g., (111a) which could run when a new record is created. For example, the tenant code may be registered to create a product audit record when a product is inserted. The tenant code may be loaded up from a content repository to the content management server 112 and executed.

Figure 2:
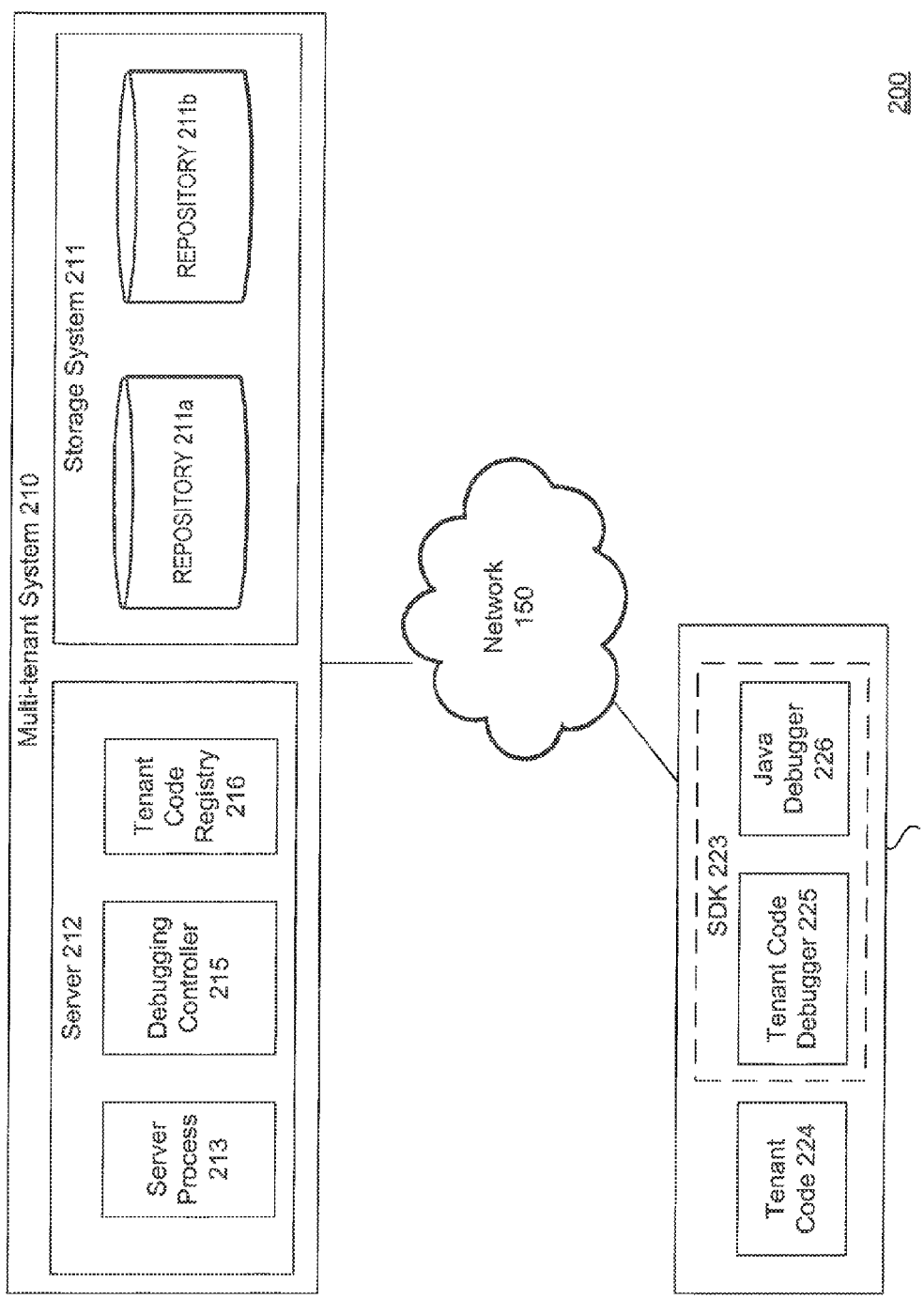
FIG. 2 illustrates an example high level block diagram of a tenant code debugging architecture according to one embodiment of the present invention.

FIG. 2 illustrates an example high level block diagram of a tenant code debugging architecture according to one embodiment of the present invention. A user may use the architecture to develop and debug tenant code. Tenant code is domain-specific code which is uploaded to a repository (e.g., 211a) by a user so that it can be executed by a server 212, and invoked by a system 210 when a particular event occurs in the lifecycle of a record therein. For example, the tenant code might be a record after-insert trigger on a Product object. In this case, when a Product is created in the system 210, it will invoke any after-insert triggers prior to committing that new Product data in a persistent storage. An event is a point in a record's lifecycle (e.g. after-insert). A trigger is domain-specific code invoked at an event in a record's lifecycle, e.g., the above after-insert trigger. A record is a "single, implicitly structured data item" in the system 210.

The user may develop the tenant code in an integrated development environment ("IDE", e.g., a Java IDE IntelliJ, Eclipse, or JDeveloper) on a user computing device (e.g., 220a). The user can use the IDE he likes, and it is not necessary to build or maintain special plug-in for each popular IDE.

As shown, a software development kit ("SDK") 223 may be downloaded to a user computing device 220a from the system 210 by the user for developing and debugging tenant code. The SDK 223 may be a set of Java libraries including the tenant code API's and a few programs. The programs may include a tenant code debugger 225, which may be a Java program. The programs may also include a Java debugger 226. The user may develop some tenant code 224, and temporarily store the tenant code 224 in the user computing device 220a for testing and debugging.

In addition to the server process shown in FIG. 1, the server 212 may have a debugging controller 215 and a tenant code registry 216. The debugging controller 215 could understand requests coming in from the SDK 223 in the user computing device 220a and interact with the tenant code debugger 225. When the debugging is done, the user may submit the tenant code to a repository (e.g., 211a or 211b) through the tenant code registry 216. In one implementation, the server process 213, the debugging controller 215 and the tenant code registry 216 may run in a JVM.

There is some registered tenant code in the repository 211a which has registered interest in particular events. When those events occur, the record may ask the tenant code registry 216 which code it should execute and then the code is executed.

Figure 3A:
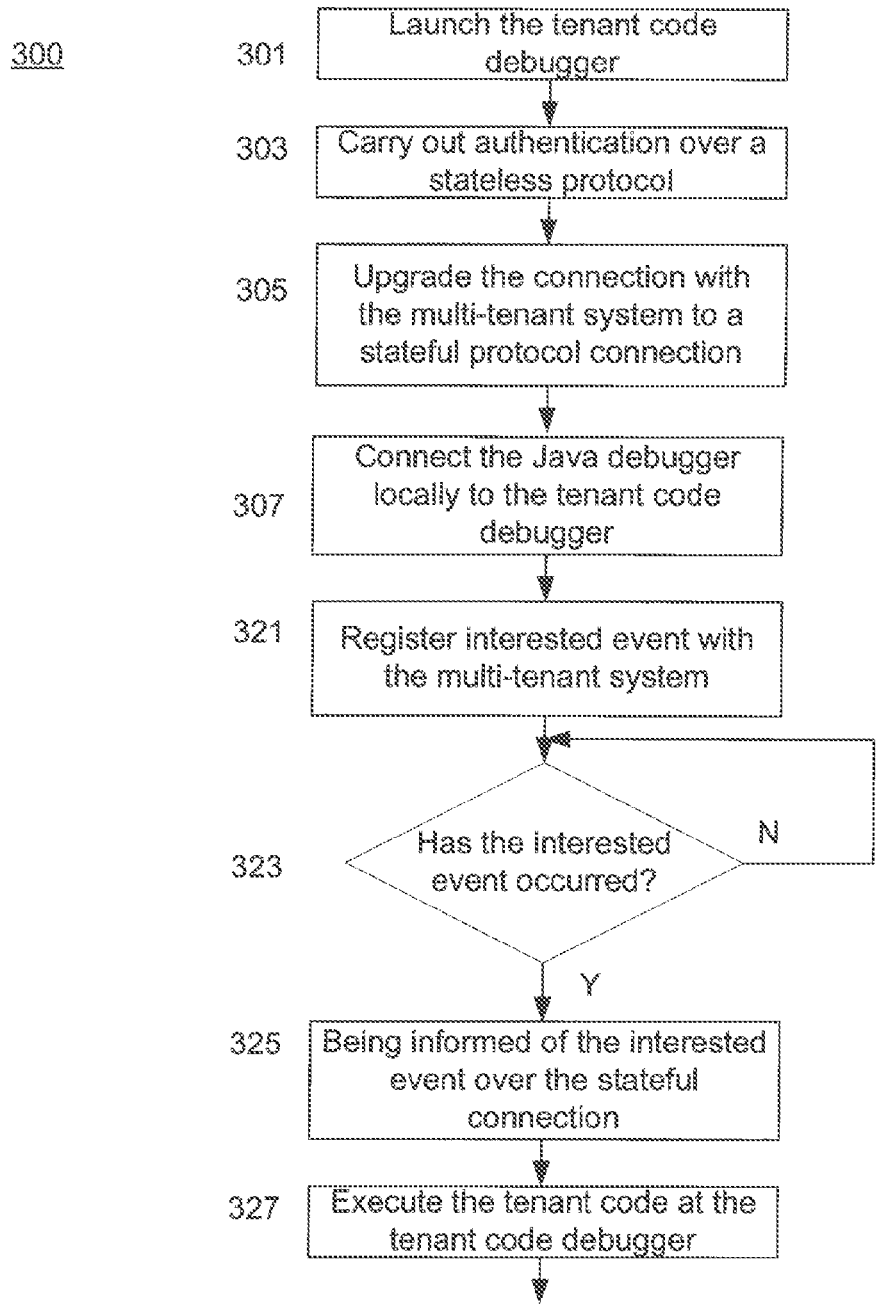
FIGS. 3A and 3B illustrate a flowchart of a method for debugging tenant code in the multi-tenant architecture according to one embodiment of the present invention.
Figure 3B:
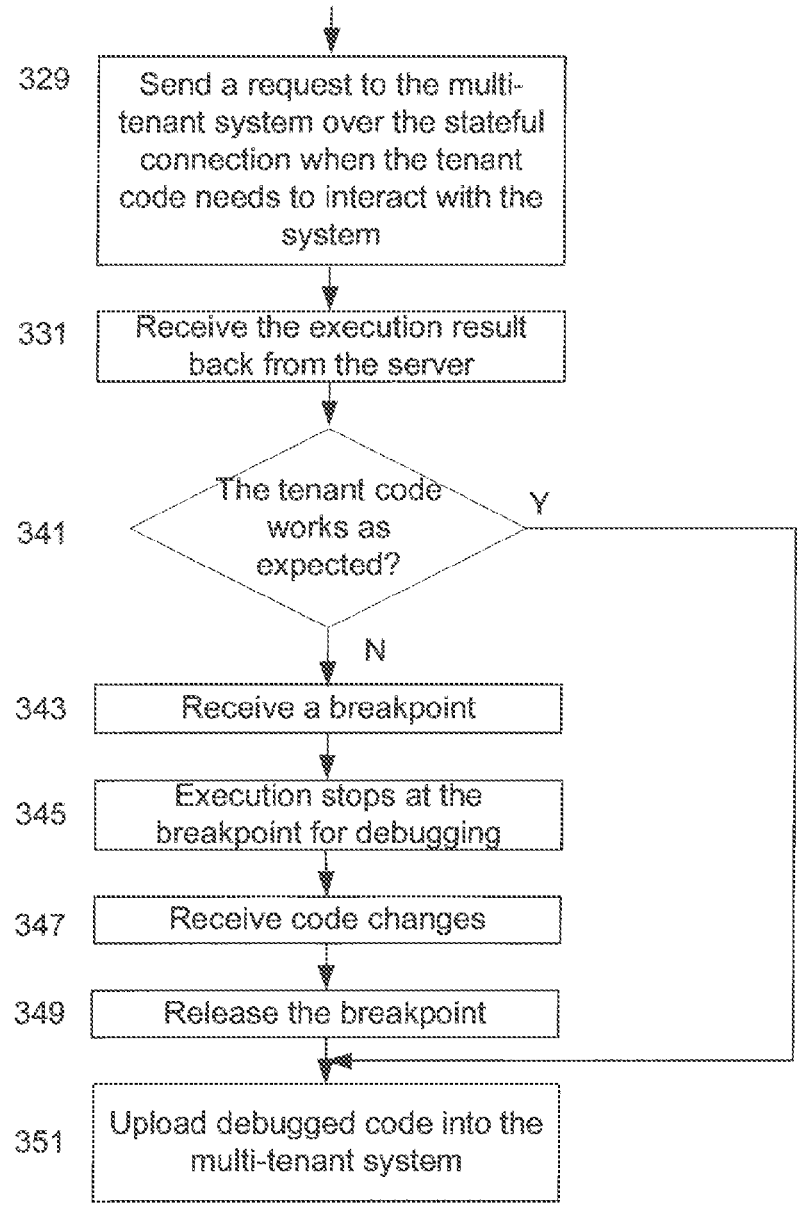

FIG. 3 illustrates a flowchart of a method for debugging tenant code in a multi-tenant system according to one embodiment of the present invention.

The user may start to develop the tenant code, e.g., a Product after-insert trigger, with the SDK 223. Prior to submitting the tenant code to the system 210, the user may use the tenant code debugger 225 to see if the tenant code behaves as expected. At 301, the tenant code debugger 225 may be launched in debug mode by the user.

At 303, a first message may be sent from the user computing device 220a to the system 210 to establish a connection therebetween. The following information may be included in the message: domain name of the tenant's exclusive share in the system 210, and the user's login information. These may be command-line inputs or inputs on a graphical user interface ("GUI") as part of the SDK 223. The authentication may be carried out over a stateless protocol which does not require the server 212 to retain session information or status about the communications partner (e.g., the user computing device 220a) for the duration of multiple requests. Examples of the stateless protocol include the Hypertext Transfer Protocol ("HTTP") and HTTP Secure ("HTTPS"). The user can then start to access the repository (e.g., 211a) he is authenticated to access and the debug session may be started.

After the debug session is initiated by the user from his computing device 220a the server 212 may need to communicate back to the user computing device 220a when/if a particular event occurs. Thus, at 305, the connection between the user computing device 220a and the system 210 may be upgraded to a stateful protocol connection which requires keeping of the internal state on the server 212, so that a two way stateful connection can be maintained between the user computing device 220a and the system 210.

One example of the stateful protocol is WebSocket. The tenant code debugger 225 may send a request to the system 210, e.g., over http(s), using the system 210's pre-existing public access port. In one implementation, the url may use the ws(s), WebSockets, or uniform resource identifier ("URI") scheme. In other words, the connection is upgraded to a two-way WebSocket connection using standard WebSocket capabilities. The debug communication will use the WebSocket protocol.

At 307, the Java debugger 226 on the user computing device 220a may be connected locally to the tenant code debugger 225.

At 321, the tenant code debugger 225 may send a second message to the system 210, registering the interested record and event, e.g., the Product after-insert event. Consequently, the system 210 is informed of the record and event that the user is interested in debugging.

At 323, it may be determined if the interested event (e.g., the Product insert) occurs in the system 210, e.g., by the debugging controller 215.

The user may open a browser, on the same user computing device 220a or a different user computing device, go to a user interface of the system 210 to create a Product record. The browser is connected to the server 212 over a connection independent from those set up at 303 and 305.

When the debugging controller 215 in the server 212 detects that an interested event has occurred, at 325, it may send a third message hack to the user computing device 220a via the stateful connection, informing the user computing device 220a of the interested event and invoking the tenant code 224. In other words, the system 210 may route execution to the user computing device 220a, and inform the user that execution is delegated to his computing device, e.g., through output in his IDE console. The server 212 can still service other tenants. There is no visibility into other threads that are going through the server 212.

The tenant code being developed is securely kept in the user computing device 220a, instead of being sent to the debugging controller 215 in the server 212. At 327, in response to the third message from the server 212, the tenant code (e.g., a trigger) may be called and executed locally within the user computing device 220a (or more specifically the tenant code debugger 225) for debugging, simulating what would happen in the server 212.

Specifically, in the debug scenario, the user has registered interest in certain record event(s). When the server 212 returns a trigger, it may return a proxy. When invoked, the proxy may send a request using the open WebSocket connection to the tenant code debugger 225 in the user computing device 220a. This, in turn, may call in to the user's tenant code 224. The system 210 may provide the tenant code debugger 225 with properly shaped proxies of the inputs it needs to properly enter the user's tenant code. Thus, although the tenant code runs on the user computing device 220a, it may function as it is on the server 212.

The tenant code being developed may include code that requires interaction from the system 210. When the execution arrives at such code, at 329, the tenant code debugger 225 may make requests to the system 210 on the authenticated secured stateful connection and interact with the system 210 through back and forth communications on the stateful connection. The communications may be carried out with controlled vocabulary in the multi-tenant architecture. The request may be, e.g., create a record.

At 331, the server 212 may interpret the request and related information from the tenant code debugger 225, execute to fulfill the request (e.g., by creating the record requested), and send the result back to the tenant code debugger 225.

The system 210 does not need to know the innards of the tenant code being debugged/executed. The system 210 only needs to know the events for which the tenant code being developed should be invoked. This may enable fast iterations of tenant code development/testing without having to re-submit code to the system 210 for each iteration.

At 341, the user may look at the effects of the trigger and decide if it works as expected.

If not, at 343, the user may set a breakpoint to better understand what his trigger is doing.

At 345, when a new Product is created from the user interface of the system 210, execution may stop at the user's breakpoint and he can use all of the built-in debugging features that Java and his IDE support, e.g., break, step over, step into, resume, resume to cursor, or conditional breakpoints.

In order to debug, the user may need to see the Product's external ID in the context of the trigger, but his trigger doesn't include any code which interacts with Product's external ID. While execution is stopped he may, e.g., launch IntelliJ's capability to execute arbitrary code, so that he can write/run code that retrieves the Product's external ID.

At 347, the user may find out why the trigger didn't behave as expected and changes his code. If the code changes are small, a JVM running locally in the user computing device 220a may hotswap the changes in the tenant code debugger 225. If the changes are more significant, he may relaunch the tenant code debugger 225 to see his changes take effect.

At 349, the user may release all breakpoints and create one more Product just to confirm that the tenant code works as expected.

If the tenant code needs to re-enter the system 210 before completion (e.g. run a query, or create a record), the tenant code debugger 225 may broker those communications by using the same open WebSocket connection to message those requests to the system 210 and return responses back to the user computing device 220a.

When the user is satisfied with how the trigger behaves, at 351, he may submit the code to the system 210 so that the code can be executed there.

In one implementation, service-protection measures may be added. For examples, the system 210 may be timed out if execution has been deferred for too long, and it may only allow debugging in a sandbox repository.

Thus, the debugging architecture can allow the user to only register the interested event when he logs in the system 210, and debug the tenant code being developed before uploading the code to the system 210. During the debugging session, the user can make all the changes, retry, and see how the tenant code will behave in cloud instance without having to upload the code until he is satisfied with the code. During the interactive debugging, the system 210 does not execute the tenant code directly, and only sends instructions to the user computing device 220a so that the tenant code debugger 225 can debug on its own. Since the actual debugging occurs in the user computing device 220a, the tenant code and the debug session can be secured from other tenants of the system 210.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, hut are not limited to, CD ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated tiles (e,g, files that store one or more modules, sorb programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A computer-implemented method for debugging tenant code for a multi-tenant system, comprising:
   sending a first message to the multi-tenant system over a first network connection, wherein the first network connection is based on a stateless protocol and the first message is for accessing a tenant's share of the multi-tenant system;
   upgrading the first network connection to a second network connection wherein the second network connection is based on a stateful protocol;
   connecting a tenant code debugger to a local debugger;
   sending a second message to the multi-tenant system to register a first event with the multi-tenant system, wherein the first event invokes execution of tenant code;
   receiving a third message at the tenant code debugger from the multi-tenant system that the first event occurred; and
   executing the tenant code locally at the tenant code debugger in response to the third message.

2. The method of claim 1, wherein the stateless protocol is HTTPS.

3. The method of claim 1, wherein the stateful protocol is WebSocket.

4. The method of claim 1, wherein the third message comprises proxies.

5. The method of claim 4, wherein the proxies comprise proxies of inputs that the multi-tenant system needs to enter the tenant code.

6. The method of claim 1, further comprising: calling the tenant code in response to the third message.

7. The method of claim 1, further comprising: sending a fourth message to the multi-tenant system over the second network connection when the tenant code needs to interact with the multi-tenant system.

8. The method of claim 7, further comprising: receiving an execution result from the multi-tenant system, wherein the execution result is generated by executing to fulfill the fourth message by the multi-tenant system.

9. The method of claim 1, further comprising: debugging the tenant code with the local debugger.

10. The method of claim 1, further comprising: submitting the tenant code to the multi-tenant system after finishing debugging.

11. A hardware implemented tenant code debugging system in a multi-tenant system, comprising:
    a tenant code debugger for:
    sending a first message to the multi-tenant system over a first network connection, wherein the first network connection is based on a stateless protocol and the first message is for accessing a tenant's share of the multi-tenant system;
    upgrading the first network connection to a second network connection, wherein the second network connection is based on a stateful protocol;
    sending a second message to the multi-tenant system to register a first event with the multi-tenant system, wherein the first event invokes execution of tenant code;
    receiving a third message from the multi-tenant system that the first event occurred; and
    executing the tenant code locally in response to the third message.

12. The system of claim 11, wherein the stateless protocol is HTTPS.

13. The system of claim 11, wherein the stateful protocol is WebSocket.

14. The system of claim 11, wherein the third message comprises proxies.

15. The system of claim 14, wherein the proxies comprise proxies of inputs that the multi-tenant system needs to enter the tenant code.

16. The system of claim 11, wherein the tenant code debugger further calls the tenant code in response to the third message.

17. The system of claim 11, wherein the tenant code debugger further sends a fourth message to the multi-tenant system over the second network connection when the tenant code needs to interact with the multi-tenant system.

18. The system of claim 17, wherein the tenant code debugger further receives an execution result from the multi-tenant system, and wherein the execution result is generated by executing to fulfill the fourth message by the multi-tenant system.

19. The system of claim 11, wherein the tenant code debugger further communicates with a local debugger to debug the tenant code.

20. A non-transitory computer-readable medium for debugging tenant code in a multi-tenant system, the computer-readable medium comprising instructions that, when executed by a computer, cause the computer to:

send a first message to the multi-tenant system over a first network connection, wherein the first network connection is based on a stateless protocol and the first message is for accessing a tenant's share of the multi-tenant system;

upgrade the first network connection to a second network connection, wherein the second network connection is based on a stateful protocol;

send a second message to the multi-tenant system to register a first event in a record lifecycle with the multi-tenant system, wherein the first event invokes execution of tenant code;

receive a third message from the multi-tenant system that the first event occurred; and execute the tenant code locally in response to the third message.

\* \* \* \* \*